US012619082B2

(12) United States Patent
Inoguchi

(10) Patent No.: US 12,619,082 B2
(45) Date of Patent: May 5, 2026

(54) DISPLAY APPARATUS

(71) Applicant: CANON KABUSHIKI KAISHA, Tokyo (JP)

(72) Inventor: Kazutaka Inoguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/814,754

(22) Filed: Aug. 26, 2024

(65) Prior Publication Data

US 2025/0076655 A1 Mar. 6, 2025

(30) Foreign Application Priority Data

Aug. 30, 2023 (JP) ................................. 2023-139640

(51) Int. Cl.
*G02B 27/01* (2006.01)

(52) U.S. Cl.
CPC .. *G02B 27/0172* (2013.01); *G02B 2027/0123* (2013.01); *G02B 2027/0132* (2013.01); *G02B 2027/0138* (2013.01)

(58) Field of Classification Search
CPC .............. G02B 27/017; G02B 27/0172; G02B 2027/0123; G02B 2027/0132; G02B 2027/0138
See application file for complete search history.

(56) References Cited

U.S. PATENT DOCUMENTS

| | | | |
|---|---|---|---|
| 10,586,392 B2 | 3/2020 | Inoguchi | |
| 2018/0149791 A1* | 5/2018 | Urness | G02B 27/4272 |
| 2023/0185094 A1 | 6/2023 | Inoguchi | |

FOREIGN PATENT DOCUMENTS

| | | | |
|---|---|---|---|
| JP | 2004317798 A | * | 11/2004 |
| JP | 3604979 B2 | | 12/2004 |
| JP | 2022144445 A | | 10/2022 |

* cited by examiner

*Primary Examiner* — Cory A Almeida

(74) *Attorney, Agent, or Firm* — Carter, DeLuca & Farrell LLP

(57) ABSTRACT

A display apparatus including display system and imaging systems for left-eye and right-eye and displaying an image of outside acquired by each of the imaging systems, the display system comprises display element, and optical element comprising incident surface, two reflection surfaces and exit surface. The display apparatus comprises limiting unit limiting light beam width so that light beam entering second pupil located behind the exit pupil does not satisfy diameter of the second pupil. When the second pupil is set at a position on an optical axis 10 mm away on an opposite side of the optical element with respect to the exit pupil, the limiting unit limits the light beam width such that at least a part of the light beam of an outermost peripheral angle of view on an outer side in the horizontal direction does not reach an evaluation pupil diameter of the second pupil.

10 Claims, 10 Drawing Sheets

DISPLAY APPARATUS

BACKGROUND OF THE INVENTION

Field of the Invention

The present invention relates to a display apparatus.

Description of the Related Art

A video see-through type head mounted display (HMD) used for mixed reality (MR), or augmented reality (AR) is known. In a video see-through type HMD, an outside image acquired by an imaging system is combined with a CG image, and the combined image is observed at a substantially equal magnification via a display system. In addition, there is a demand for an experience in which the surrounding outside of the video see-through type HMD is rarely shielded, and the MR space observed through the HMD and the outside coexist.

Japanese Patent No. 3604979 discloses a technique in which an optical axis of an imaging system and an optical axis of a display system are made to substantially coincide with each other, and a distance between an incident pupil of the imaging system and an exit pupil of the display system is appropriately arranged, thereby reducing a sense of discomfort between the outside when the HMD is not worn and the outside viewed in a video see-through manner. Japanese Patent Application Laid-Open No. 2022-144445 discloses an image display apparatus provided with a small-sized optical system which gives little sense of discomfort to an observer when the observer observes an image of the outside.

However, Japanese Patent No. 3604979 and Japanese Patent Application Laid-Open No. 2022-144445 do not disclose an experience in which the MR space observed through the HMD and the outside coexist.

SUMMARY OF THE INVENTION

The present disclosure has an object to provide a display apparatus capable of providing an experience in which MR space observed through HMD and the outside coexist.

In order to achieve the above-mentioned object, according to the present disclosure, a display apparatus including a display system and imaging systems for a left-eye and a right-eye arranged on an outside of the display system, and configured to display an image of the outside acquired by each of the imaging systems at substantially equal magnification on the display system, the display system comprising: a display element, and an optical element comprising an incident surface, two reflection surfaces and an exit surface, wherein the optical element is configured such that light emitted from a central position of the display element enters the optical element from the incident surface, is reflected by the two reflection surfaces so as to be directed outward in a horizontal direction while being folded in a visual axis direction, is emitted from the exit surface, and is guided to an exit pupil of the optical element, wherein the display apparatus comprises a limiting unit configured to limit a light beam width so that a light beam entering a second pupil located behind the exit pupil does not satisfy a diameter of the second pupil, and wherein when the second pupil is set at a position on an optical axis 10 mm away on an opposite side of the optical element with respect to the exit pupil as a reference, the limiting unit limits the light beam width such that at least a part of the light beam of an outermost peripheral angle of view on an outer side in the horizontal direction does not reach an evaluation pupil diameter of the second pupil.

Further features of the present invention will become apparent from the following description of exemplary embodiments with reference to the attached drawings.

DESCRIPTION OF THE EMBODIMENTS

Embodiment

Figure 1:
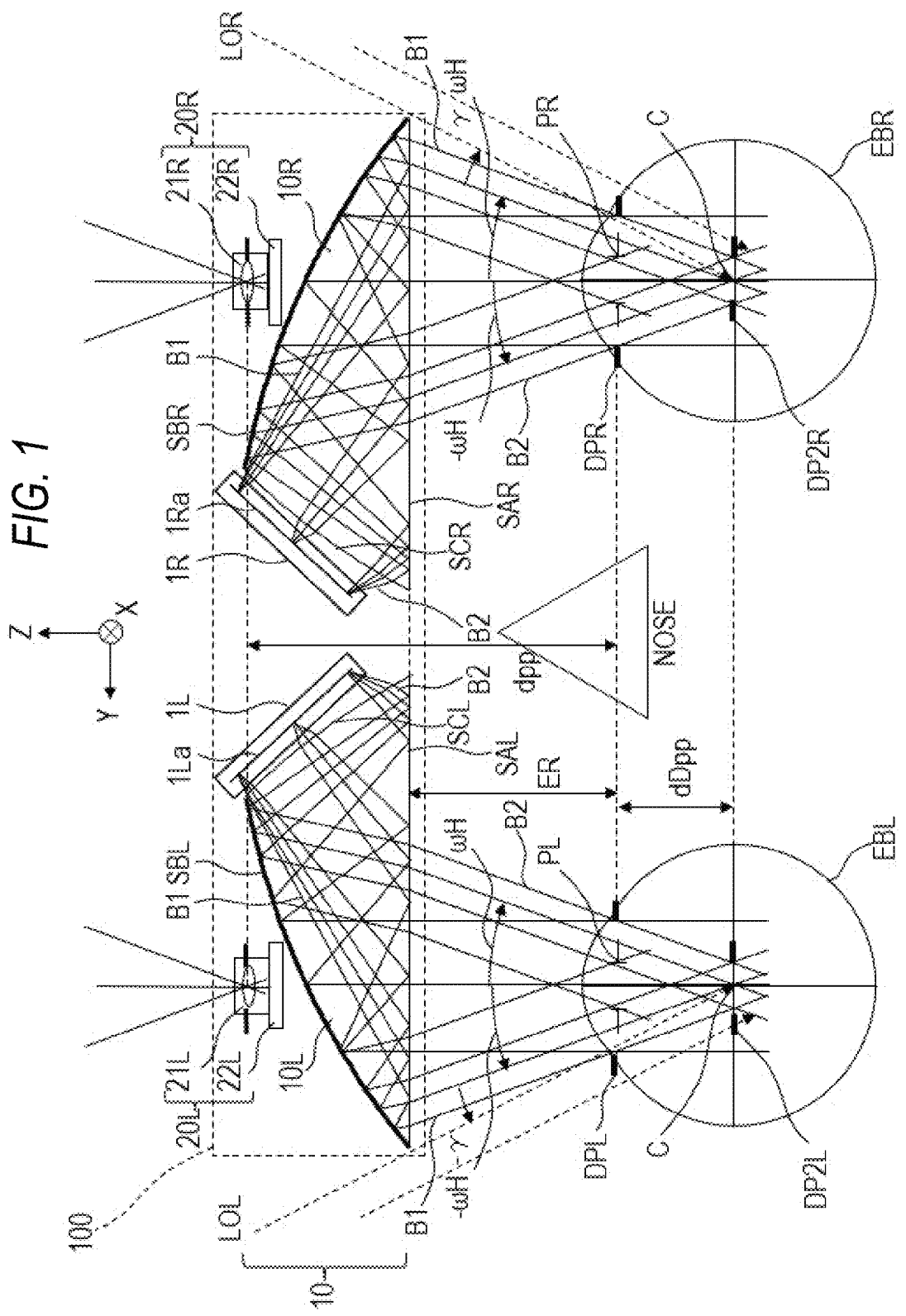
FIG. 1 is a schematic view of a main part of a display apparatus (100) according to an embodiment of the present disclosure.

Preferred embodiments of the present invention will now be described in detail in accordance with the accompanying drawings. FIG. 1 is a schematic view of a main part of a display apparatus 100 according to an embodiment of the present disclosure. The paper surface of FIG. 1 corresponds to YZ plane (cross section), and Y axis is defined in a horizontal direction, Z axis is defined in a visual axis direction, and X axis is defined in a direction perpendicular to the paper surface. The YZ plane is a horizontal cross section of the display apparatus 100 of the present disclosure.

The display apparatus 100 includes a display system 10, and a right-eye imaging system 20R (imaging system) and a left-eye imaging system 20L which are arranged on the outside of the display system 10. The display apparatus 100 displays each of the images of the outside acquired by the right-eye imaging system 20R and the left-eye imaging system 20L at substantially the equal magnification on the display system 10. The display system 10 includes a right-eye display optical system 10R (optical element) and a right-eye display element 1R, and a left-eye display optical system 10L and a left-eye display element 1L, which are arranged inside the display apparatus 100. Note that the configuration for the right-eye and the configuration for the left-eye are the same, and a letter R is added to the end of the configuration member for the right-eye, and a letter L is added to the end of the configuration member for the left-eye.

The right-eye display optical system 10R has three surfaces, i.e., an incident surface SCR, a reflection surface SBR, and an optical surface SAR (reflection surface, exit surface) which is used for both transmission and reflection, and is formed as a decentered prism-shaped prism apparatus formed on a medium having a refraction index n>1. That is, the display optical system 10R includes an incident surface SCR, a reflection surface SBR and an optical surface SAR as two reflection surfaces, and optical surface SAR as an exit surface. A light beam emitted from the center position of the display surface 1Ra of the right-eye display element 1R in the long axis direction enters the prism apparatus from the incident surface SCR of the display optical system 10R and is reflected once by the optical surface SAR. Then, the light is reflected again by the reflection surface SBR so as to be directed horizontally outward while being folded in the visual axis direction, emerges from the optical surface SAR, and is guided to a right-eye exit pupil DPR of the display optical system 10R. At this time, a light beam emitted from the central portion of the display area of the display surface 1Ra of the display element 1R and guided to the exit pupil DPR reaches the center of the exit pupil DPR as a light beam parallel to the Z axis. A straight line along which the bent light beam passes through a space after the display optical system 10R is defined as an optical axis of the display optical system 10R. In the section of the incident surface SCR→the optical surface SAR→the reflection surface SBR, the light beam travels in the negative direction of the Y axis (outward direction of the display apparatus 100). On the other hand, in the section of the incident surface SCR→the optical surface SAR→the reflection surface SBR→the optical surface SAR, the light beam travels in the order of negative, positive, and negative directions when viewed from the Z axis, and the optical path is formed in a folded shape. Thus, the display optical system 10R which is thin in the Z axis direction is realized.

Like the right-eye display optical system 10R, the left-eye display optical system 10L has three surfaces, i.e., an incident surface SCL, a reflection surface SBL, and an optical surface SAL for both transmission and reflection and is constructed as a prism apparatus having a decentered prism shape formed on a medium having a refraction index n>1. In addition, a light beam emitted from the center position in the long axis direction of a display surface 1La of the display element 1L for the left-eye enters the prism apparatus from the incident surface SCL of the display optical system 10L and is reflected once by the optical surface SAL. Then, the light is reflected again by the reflection surface SBL so as to be directed horizontally outward while being folded in the visual axis direction, emerges from the optical surface SAL, and is guided to an exit pupil DPL for the left-eye of the display optical system 10L. At this time, the light beam emitted from the central portion of the display area of the display surface 1La of the display element 1L and guided to the exit pupil DPL reaches the center of the exit pupil DPL as a light beam parallel to the Z axis. A straight line along which the bent light beam passes through a space after the display optical system 10L is defined as an optical axis of the display optical system 10L. In the section of the incident surface SCL→the optical surface SAL→the reflection surface SBL, the light beam travels in the positive direction of the Y axis (outward direction of the display apparatus 100). On the other hand, in the section of the incident surface SCL→the optical surface SAL→the reflection surface SBL→the optical surface SAL, the light beam travels in the order of negative, positive, and negative directions when viewed from the Z axis, and the optical path is formed in a folded shape. Thus, the display optical system 10L which is thin in the Z axis direction is realized.

The optical surfaces SAR and SAL are however, it is desirable that a light beam reaching the exit pupils DPR and DPL is incident at an angle equal to or larger than the critical angle at the time of reflection and is totally reflected, when the light is transmitted, it is preferable that the light is incident at an angle less than the critical angle and is transmitted because the light use efficiency is high. In addition, a divergent light beam emitted from one point on the display elements 1R and 1L is converted into a parallel light beam by a refractive action when passing through the display optical systems 10R and 10L and is guided to the exit pupils DPR and DPL. Therefore, an observer who places a right eyeball EBR and a left eyeball EBL so that the pupils PR and PL are located on the surfaces of the exit pupils DPR and DPL can observe a virtual image formed at an infinite distance of the image displayed on the display elements 1R and 1L. A light beam parallel to the Z axis which is emitted from the center of the display surface 1Ra and reaches the center of the exit pupil DPR and a light beam which is emitted from both ends of the display surface 1Ra on the YZ cross section and reaches the center of the exit pupil DPR are each a horizontal maximum angle of view principal ray having an angle of view ωH (display maximum angle of view) in absolute value. Therefore, the horizontal viewing angle HFOV (horizontal angle of view) of the display apparatus 100 is 2×ωH. The same applies to a light beam parallel to the Z axis which is emitted from the center of the display surface 1La and reaches the center of the exit pupil DPL, and a light beam which is emitted from both ends of the display surface 1La on the YZ cross section and reaches the center of the exit pupil DPL.

In addition, on the outside of the right-eye display optical system 10R, there is the right-eye imaging system 20R including an image pickup element 22R and an imaging optical system 21R, on the outside of the left-eye display optical system 10L, there is a left-eye imaging system 20L including an image pickup element 22L and an imaging optical system 21L. The optical axis of the right-eye imaging system 20R substantially coincides with the optical axis of the right-eye display optical system 10R, and the optical axis of the left-eye imaging system 20L substantially coincides with the optical axis of the left-eye display optical system 10L. In addition, since the display optical system 10R, 10L and the imaging optical system 21R, 21L are thin in the Z axis direction, it is possible to reduce the distance dpp between the incident pupils of the imaging optical system 21R, 21L and the exit pupil DPR, DPL of the display optical system 10R, 10L. This enables image observation with less the sense of discomfort between the outside (real space) and the HMD display (MR space). The eye relief ER corresponds to the distance from the exit pupil DPR to the display optical system 10R.

In the embodiment, the second pupil DP2R is set behind (in the negative Z axis direction) the exit pupil DPR by dDpp in the right-eye display optical system 10R, and the second pupil DP2L is set behind (in the negative Z axis direction) the exit pupil DPL by dDpp in the left-eye display optical system 10L. In the right-eye display optical system 10R, a light B1 emitted from an uppermost end portion of the display surface 1Ra of the display element 1R becomes parallel light having the angle of view ωH and enters the exit pupil DPR and the second pupil DP2R as a light beam having a horizontally outermost peripheral angle of view. Similarly, a light B2 emitted from the end portion on the lowermost side of the display surface 1Ra of the display element 1R also becomes parallel light of the angle of view ωH and enters the exit pupil DPR and the second pupil DP2R as a light beam of a horizontally innermost peripheral angle of view. On the other hand, external light LOR having the smallest incident angle and entering a center C of the second pupil DP2R from the outside of the display apparatus 100, is incident at an angle γ larger than the light beam entering the center C of the second pupil DP2R at the angle of view ωH. As the angle γ is smaller, a break between the HMD display (MR space) image and the outside (real space) direct observation image is smaller, which is preferable.

Similarly, in the display optical system 10L for the left-eye, the light B1 emitted from the uppermost end portion of the display surface 1La of the display element 1L enters the exit pupil DPL and the second pupil DP2L as parallel light beam having the angle of view ωH. On the other hand, external light LOL having the smallest incident angle and entering the center C of the second pupil DP2L from the outside of the display apparatus 100, is incident at an angle γ larger than the light beam entering the center C of the second pupil DP2L at the angle of view−ωH.

In the display apparatus 100 of the embodiment, the decentered optical system (prism) as described above is used for the display optical systems 10R and 10L. In addition, since the angle γ is small, basically, there is little break between the HMD display (MR space) image and the outside (real space) direct observation image, and it is possible to perform the MR experience in which the HMD display image and the outside direct observation image are recognized as being connected to each other. The diameters of the second pupils DP2R and DP2L are substantially equal to the diameters of the pupils PR and PL, and the distances dDpp are substantially equal to the distances between the centers of rotation of the eyeballs and the pupils PR and PL. With such a setting, it is possible to read a bright-dark state or the like at an arbitrary angle-of-view position of the HMD display image from an image acquired by the camera in which the optical system incident pupils are arranged at the second pupils DP2R and DP2L. In the present embodiment, hereinafter, for the right-eye display optical system 10R, it is assumed that the diameter of the second pupil DP2R (evaluation pupil diameter) is φ4 mm, and the second pupil DP2R is located at a position in the −Z direction 10 mm from the exit pupil DPR of the optical system. Similarly, for the left-eye optical system, it is assumed that the diameter of the second pupil DP2L (evaluation pupil diameter) is φ4 mm, and the second pupil DP2L is located at a position in the −Z direction 10 mm from the exit pupil DPL of the display optical system 10L.

In the present disclosure, in the above configuration, a light beam width limitation (limiting unit) according to each embodiment is added to limit the light beam width so that the beam entering the second pupil DP2R located behind the exit pupil DPR does not satisfy the diameter of the second pupil DP2R. By limiting the light beam width, it is possible to realize an experience in which the MR space observed through the HMD and the outside (real space) directly observed are connected and coexist. Note that, since each embodiment also has a bilaterally symmetrical configuration, the configuration for the right-eye will be mainly described, the configuration for the left-eye will be described as necessary, and the description of the same configuration will be omitted.

First Example

Figure 2:
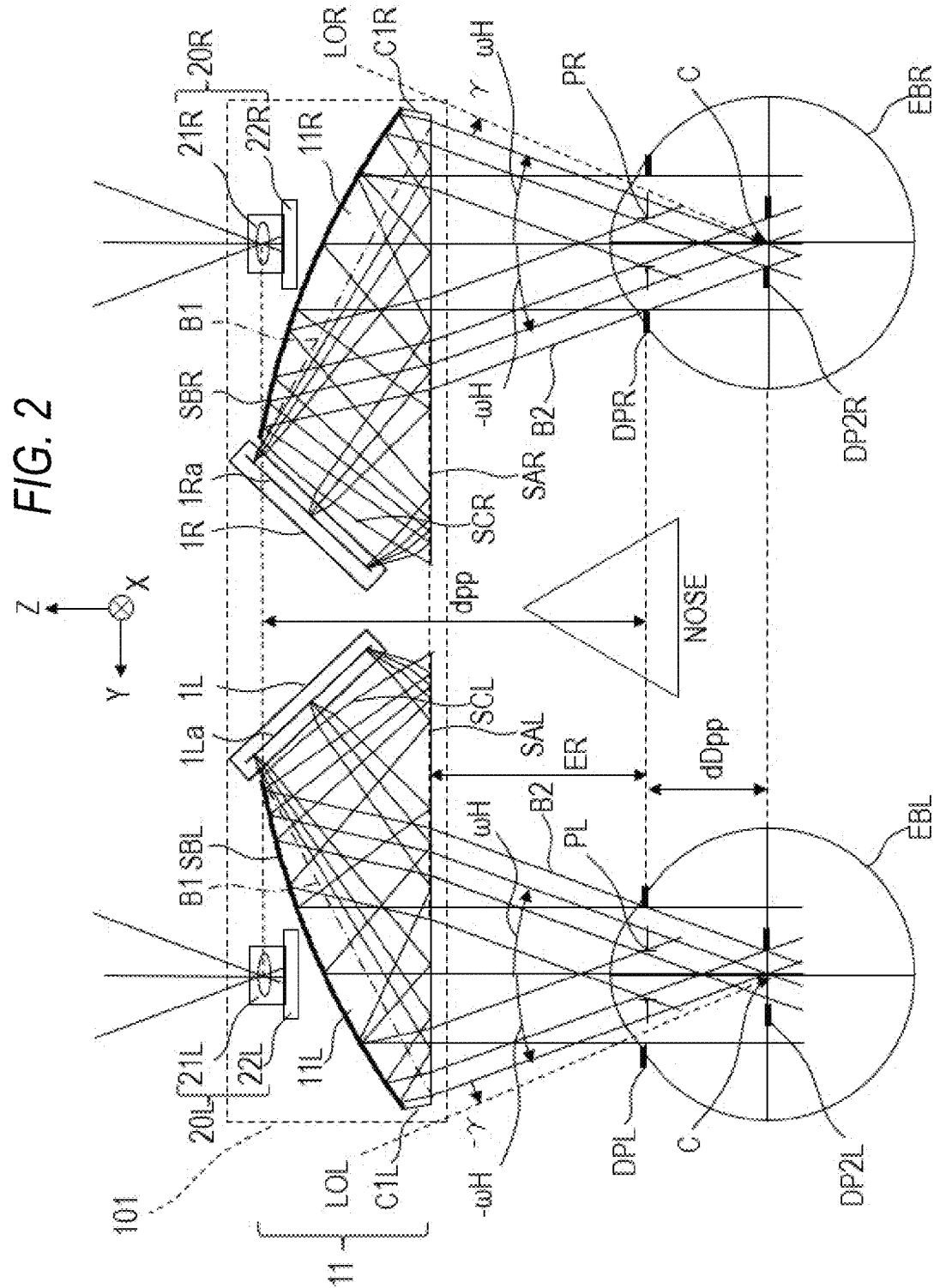
FIG. 2 is a schematic view of a main part of a display apparatus (101) according to a first example.

FIG. 2 is a schematic view of a main part of a display apparatus 101 according to a first example of the present disclosure. The same members as those in the embodiment are denoted by the same reference numerals, and the description of the reference numerals and the description of the optical paths are omitted. The difference between the first example and the embodiment (FIG. 1) is that the acute angle portion (outer end of the prism) formed by the optical surface SAR and the reflection surface SBR of the right-eye display optical system 10R in FIG. 1 is cut off. In a display optical system 11R (optical element), a first end surface CIR (end surface) is formed by cutting off the acute angle portion, the outer width of the display light beam of the angle of view ωH entering the second pupil DP2R is limited, and the light beam width limitation is applied so as not to satisfy the diameter of the second pupil DP2R. That is, the first end surface CIR is a limiting unit that limits the light beam width, and at least a part (light B1) of the light beam of the outermost peripheral angle of view on the outer side in the horizontal direction does not reach the evaluation pupil diameter at the second pupil DP2R located behind the exit pupil DPR.

By forming the first end surface CIR in the display optical system 11R, the light B1 indicated by the alternate long and short dash line emitted from the end portion on the uppermost side of the display surface 1Ra of the display element 1R is not reflected by the reflection surface SBR and does not enter the exit pupil DPR and the second pupil DP2R. With this configuration, the angle γ between the angle of view of the light beam entering the center C of the innermost second pupil DP2R of the observation image as the directly viewed outside (real space) and the angle of view ωH can be made smaller than that in FIG. 1. Then, it is possible to perform MR experience in which the HMD display (MR space) image and the outside (real space) direct observation image are recognized to be more connected to each other. According to the first example, it is possible to provide the display apparatus 101 that can provide the user to an experience the MR space observed through the HMD and the outside directly observed are connected and coexist.

In addition, it is preferable that the angle γ with respect to the angle of view ωH of the incident light on the second pupil DP2R, including the of the display optical system 11R and the exterior of the display apparatus 101, is at least γ≤ωH/2. By doing so, it is possible to prevent the connection between the HMD display (MR space) image and the outside (real space) direct observation image from being perceived as weak.

Figure 3B:
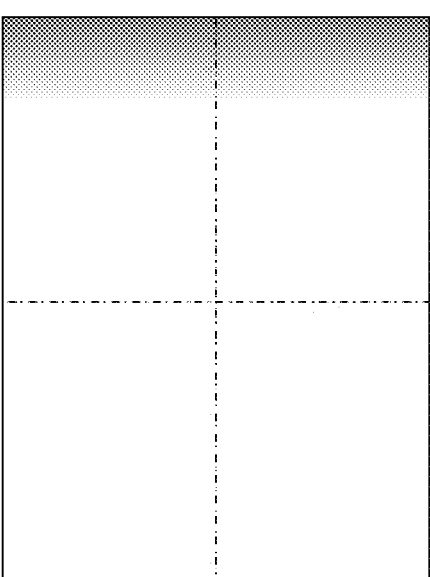
FIG. 3A and FIG. 3B are views illustrating images acquired by a camera in which an optical system incident pupil is arranged at the position of the second pupil in the display apparatus (101) of the first example.
Figure 3A:
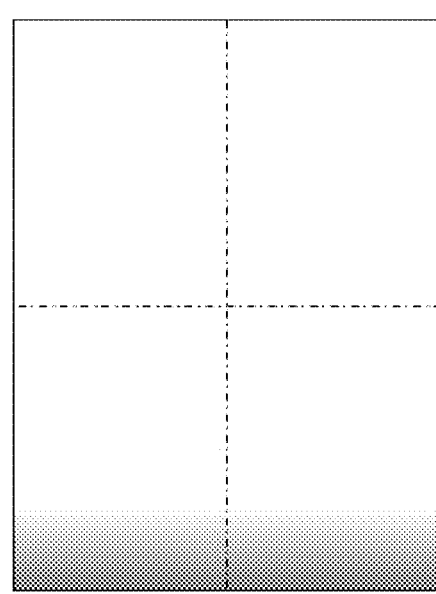

FIG. 3A and FIG. 3B are views illustrating images acquired by a camera as an optical system incident pupil which is arranged at the position of the second pupil DP2R in the first example. As the display image, a fully white image in which the entire effective region of the display surface 1Ra is illuminated with the maximum brightness is used. The pupil diameter of the camera is φ4 mm in accordance with the second pupil DP2R. FIG. 3A illustrates an image acquired by the camera arranged at the position of the second pupil DP2L for the left-eye, and FIG. 3B illustrates an image acquired by the camera arranged at the position of the second pupil DP2R for the right-eye. What can be understood from the image is that when gazing at the periphery of the right side, the display image observed by the right-eye is dimmed, and the image observed by the left-eye is not dimmed. On the other hand, when gazing at the periphery of the left side, the display image observed by the left-eye is dimmed, and the image observed by the right-eye is not dimmed.

Second Example

Figure 4:
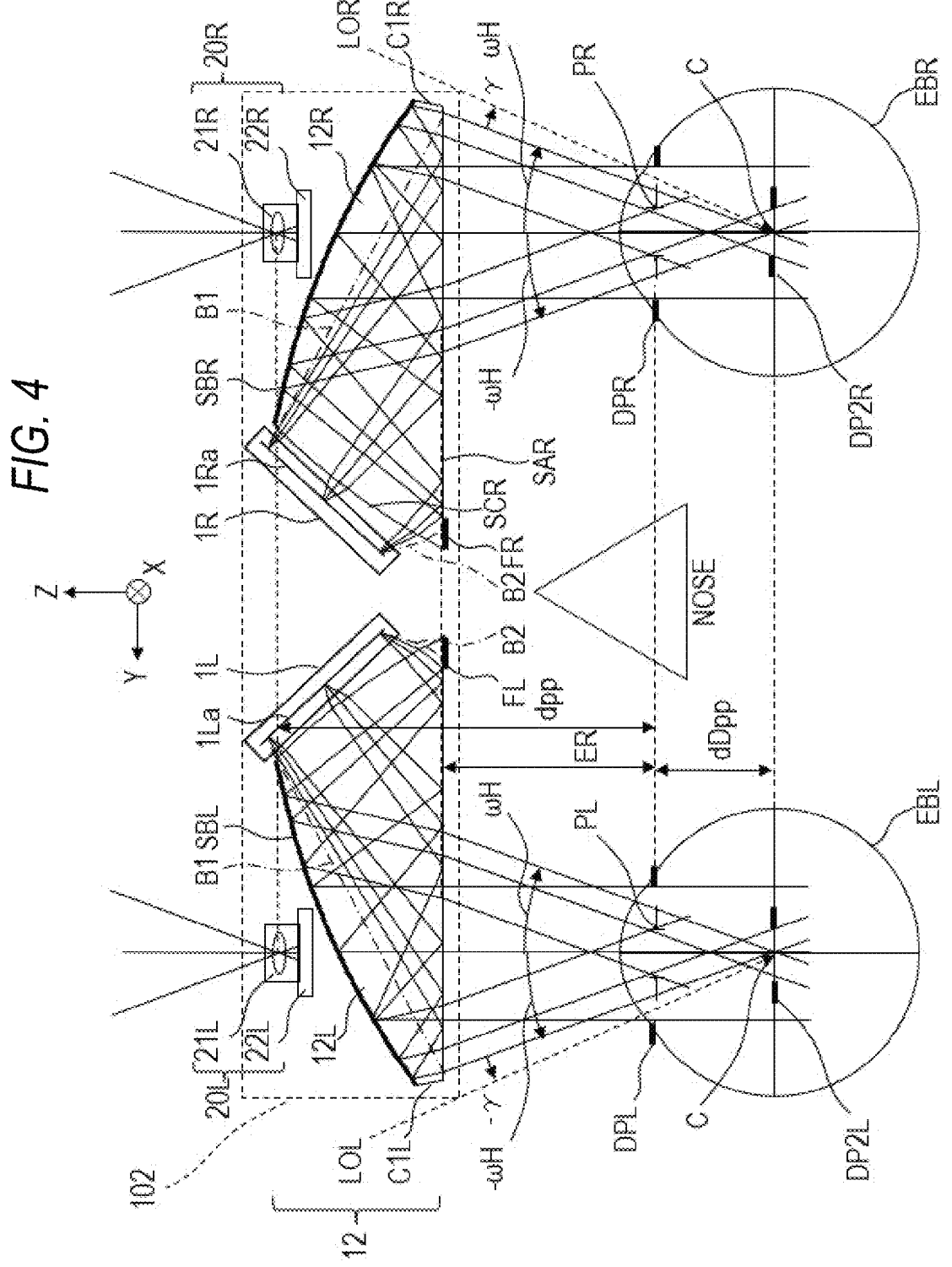
FIG. 4 is a schematic view of a main part of a display apparatus (102) according to a second example.

FIG. 4 is a schematic view of a main part of a display apparatus 102 according to a second example of the present disclosure. The same members as those in the embodiment are denoted by the same reference numerals, and the description of the reference numerals and the description of the optical paths are omitted. In the first example, the difference in brightness between the images observed by the right-eye and left-eye as illustrated in FIG. 3A and FIG. 3B may cause a visual field conflict in some cases, making it difficult to fuse the images. In view of such a situation, the second example is configured as follows.

The difference between the second example and the first example (FIG. 2) is that a light absorbing film FR (light shielding film) such as a black paint is applied to a part of the inner end of the optical surface SAR (reflection surface) of a display optical system 12R (optical element). Since the display optical system 12R of the second example has the first end surface CIR similar to that of the first example, the first end surface CIR of the display optical system 12R limits the light beam widths of the right angle of view ωH generated on the second pupil DP2R. Furthermore, the light absorbing film FR also limits the light beam width at the opposite left angle of view−ωH. That is, the first end surface CIR and the light absorbing film FR are limiting units that limit the light beam width, and at least a part (light B1) of the light beam of the outermost peripheral angle of view on the outer side in the horizontal direction does not reach the evaluation pupil diameter at the second pupil DP2R located behind the exit pupil DPR. Furthermore, a part (light B2) of the light beam of the innermost peripheral angle of view on the inner side in the horizontal direction does not reach the evaluation pupil diameter at the position of the second pupil DP2R behind the exit pupil DPR.

By forming the light absorbing film FR at the inner end of the display optical system 12R, the light B2 shown by the alternate long and short dash line emitted from the end portion on the lowermost side of the display surface 1Ra of the display element 1R is not reflected by the optical surface SAR and does not enter the exit pupil DPR and the second pupil DP2R. With this configuration, the light beam of the outermost angle of view is limited to the light beam of the innermost angle of view of the display image in the display apparatus 102. In the second example, in addition to the light beam width limitation of the first example, a light beam width limitation is applied so as to be substantially plane-symmetrical with respect to the XZ plane passing through the center of the second pupil DP2R.

Figure 5A:
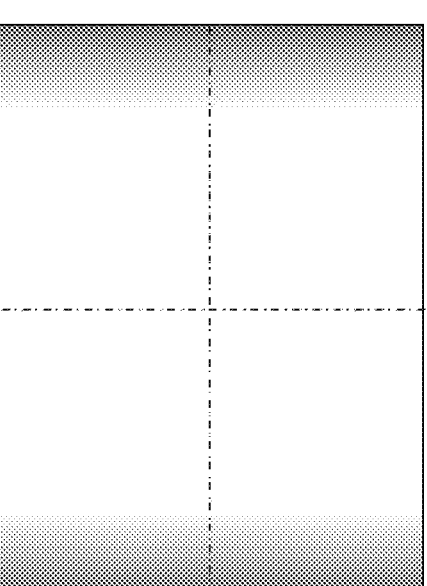
FIG. 5A and FIG. 5B are views illustrating images acquired by a camera in which an optical system incident pupil is arranged at the position of the second pupil in the display apparatus (102) of the second example.
Figure 5B:
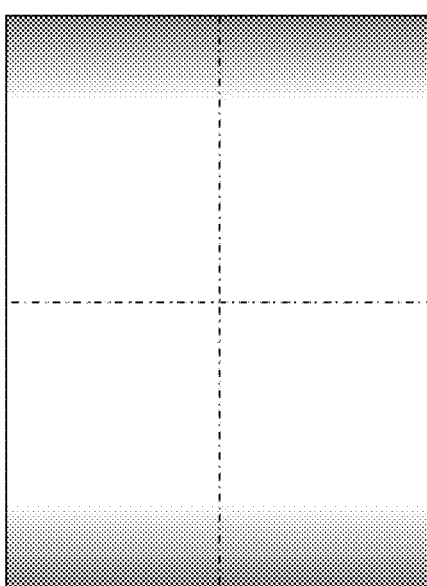

FIG. 5A and FIG. 5B are views illustrating images acquired by a camera as an optical system incident pupil which is arranged at the position of the second pupil DP2R in the second example. FIG. 5A illustrates an image acquired by the camera arranged at the position of the second pupil DP2L for the left-eye, and FIG. 5B illustrates an image acquired by the camera arranged at the position of the second pupil DP2R for the right-eye. What can be understood from the images is that when gazing at the periphery of the right side, the display image observed by the right-eye and the display image observed by the left-eye are similarly dimmed. On the other hand, when gazing at the periphery of the left side, the display image observed by the left-eye and the display image observed by the right-eye are similarly dimmed. In this way, by reducing the difference in brightness between the images observed by the left-eye and the right-eye, it is possible to make it difficult for a visual field conflict to occur and make it easy for fusion to occur. According to the second example, it is possible to provide the display apparatus 102 that can provide the user to an experience the MR space observed through the HMD and the outside directly observed are connected and coexist.

Third Example

Figure 6:
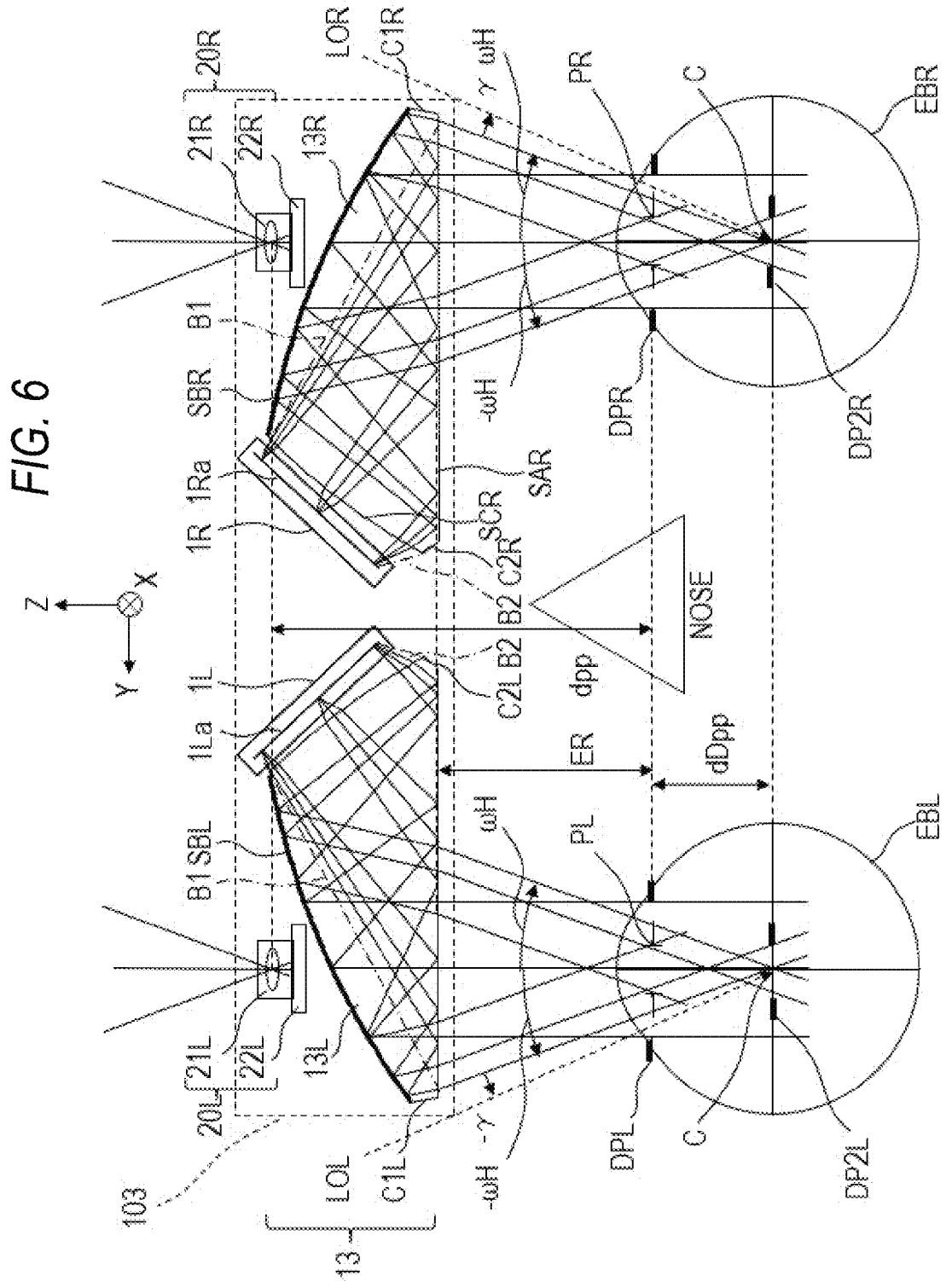
FIG. 6 is a schematic view of a main part of a display apparatus (103) according to a third example.

FIG. 6 is a schematic view of a main part of a display apparatus 103 according to a third example of the present disclosure. The same members as those in the embodiment are denoted by the same reference numerals, and the description of the reference numerals and the description of the optical paths are omitted. The difference between the third example and the second example (FIG. 4) is that instead of applying the light absorbing film FR, the acute angle portion (inner end of the prism) formed by the optical surface SAR and the incident surface SCR of the right-eye display optical system 12R in FIG. 4 is cut off. In a display optical system 13R (optical element), a second end surface C2R (end surface) is formed by cutting off the acute angle portion, the inside of the display light beam of the angle of view ωH entering the second pupil DP2R is limited, and the light beam width is limited so as not to satisfy the diameter of the second pupil DP2R. That is, the first end surface CIR and the second end surface C2R are limiting units that limit the light beam width, and at least a part (light B1) of the light beam of the outermost peripheral angle of view on the outer side in the horizontal direction does not reach the evaluation pupil diameter at the second pupil DP2R. Furthermore, a part (light B2) of the light beam of the innermost peripheral angle of view on the inner side in the horizontal direction does not reach the evaluation pupil diameter at the position at the second pupil DP2R.

By forming the second end surface C2R in the display optical system 13R, the light B2 indicated by the alternate long and short dash line emitted from the end portion on the lowermost side of the display surface 1Ra of the display element 1R is not reflected by the optical surface SAR and does not enter the exit pupil DPR and the second pupil DP2R. With this configuration, the same effect as that of the second example can be acquired. Although the decentered prism element has two acute angle portions, the third example corresponds to the case where both of the two acute angle portions are cut off, and the second example corresponds to the case where one acute angle portion is removed.

Fourth Example

Figure 7:
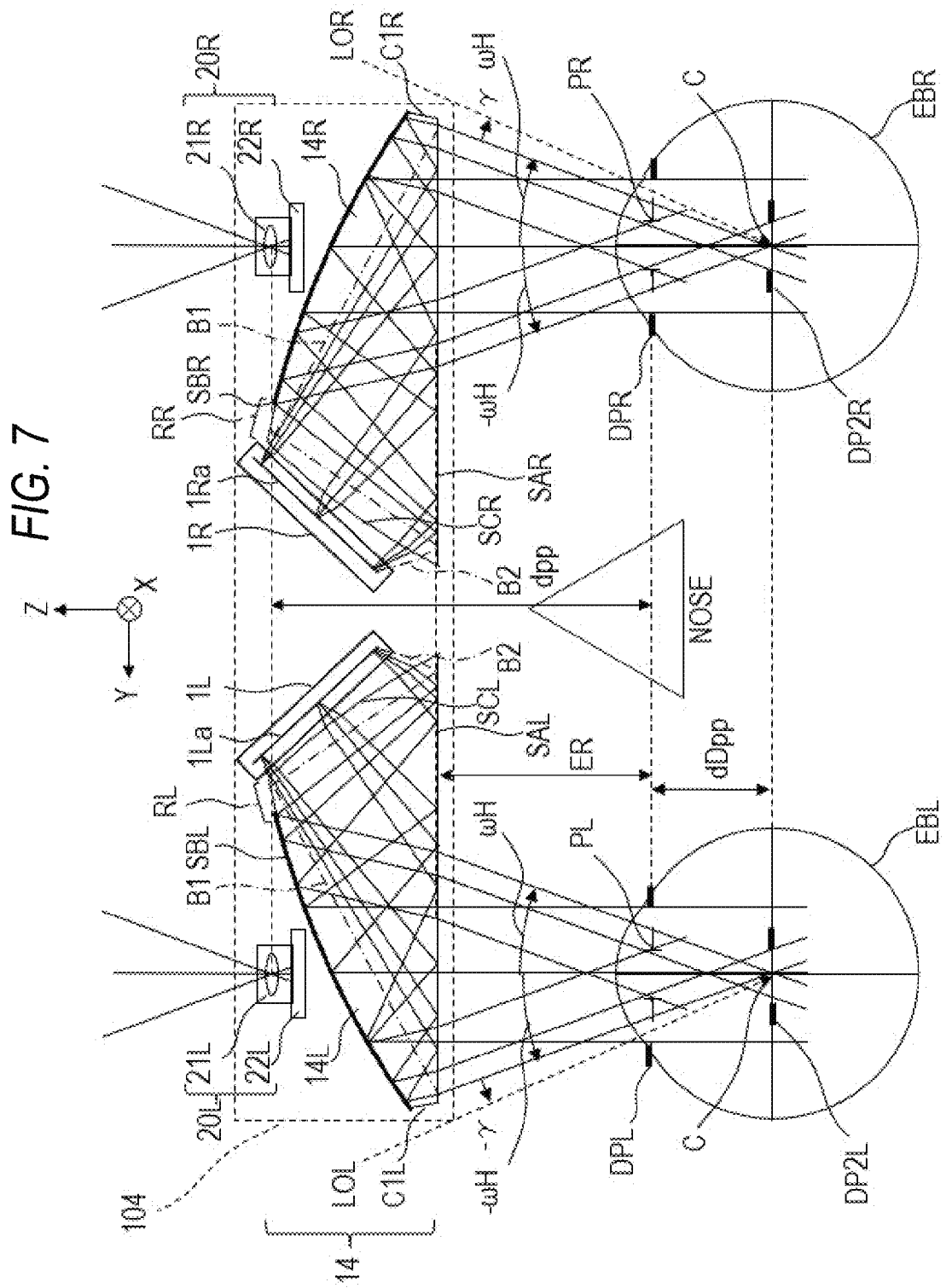
FIG. 7 is a schematic view of a main part of a display apparatus (104) according to a fourth example.

FIG. 7 is a schematic view of a main part of a display apparatus 104 according to a fourth example of the present disclosure. The same members as those in the embodiment are denoted by the same reference numerals, and the description of the reference numerals and the description of the optical paths are omitted. The difference between the fourth example and the second example (FIG. 4) is that instead of the light absorbing film FR, a portion (a reflective film area limiting portion RR which limits the area of the reflective film on the reflection surface SBR) that limits the area of the reflection surface SBR of the display optical system 12R for the right-eye in FIG. 4 is provided to limit the area of the reflective film on the reflection surface SBR. A display optical system 14R (optical element) is provided with this reflective film area limiting portion RR, which limits the inner side of the display light beam with the angle of view ωH entering the second pupil DP2R, and the light beam width is limited so as not to satisfy the diameter of the second pupil DP2R. That is, the first end surface CIR and the reflective film area limiting portion RR are limiting units that limit the light beam width, and at least a part (light B1) of the light beam of the outermost peripheral angle of view on the outer side in the horizontal direction does not reach the evaluation pupil diameter of the second pupil DP2R. Furthermore, a part (light B2) of the light beam of the innermost peripheral angle of view on the inner side in the horizontal direction does not reach the evaluation pupil diameter at the position of the second pupil DP2R.

By forming the reflective film area limiting portion RR in the display optical system 14R, the light B2 indicated by the alternate long and short dash line emitted from the end portion on the lowermost side of the display surface 1Ra of the display element 1R is not reflected by the reflection surface SBR, and does not enter the exit pupil DPR and the second pupil DP2R. With this configuration, the same effect as that of the second example can be acquired.

In both of the third and fourth examples, the image acquired by the camera in which the optical system incident pupil is arranged at the position of the second pupil is the same as that illustrated in FIG. 5A and FIG. 5B, and by reducing the difference in brightness generated in the images observed by the left-eye and the right-eye, it is possible to achieve a situation in which the binocular rivalry is unlikely to occur and the images are likely to be fused.

Fifth Example

Figure 8:
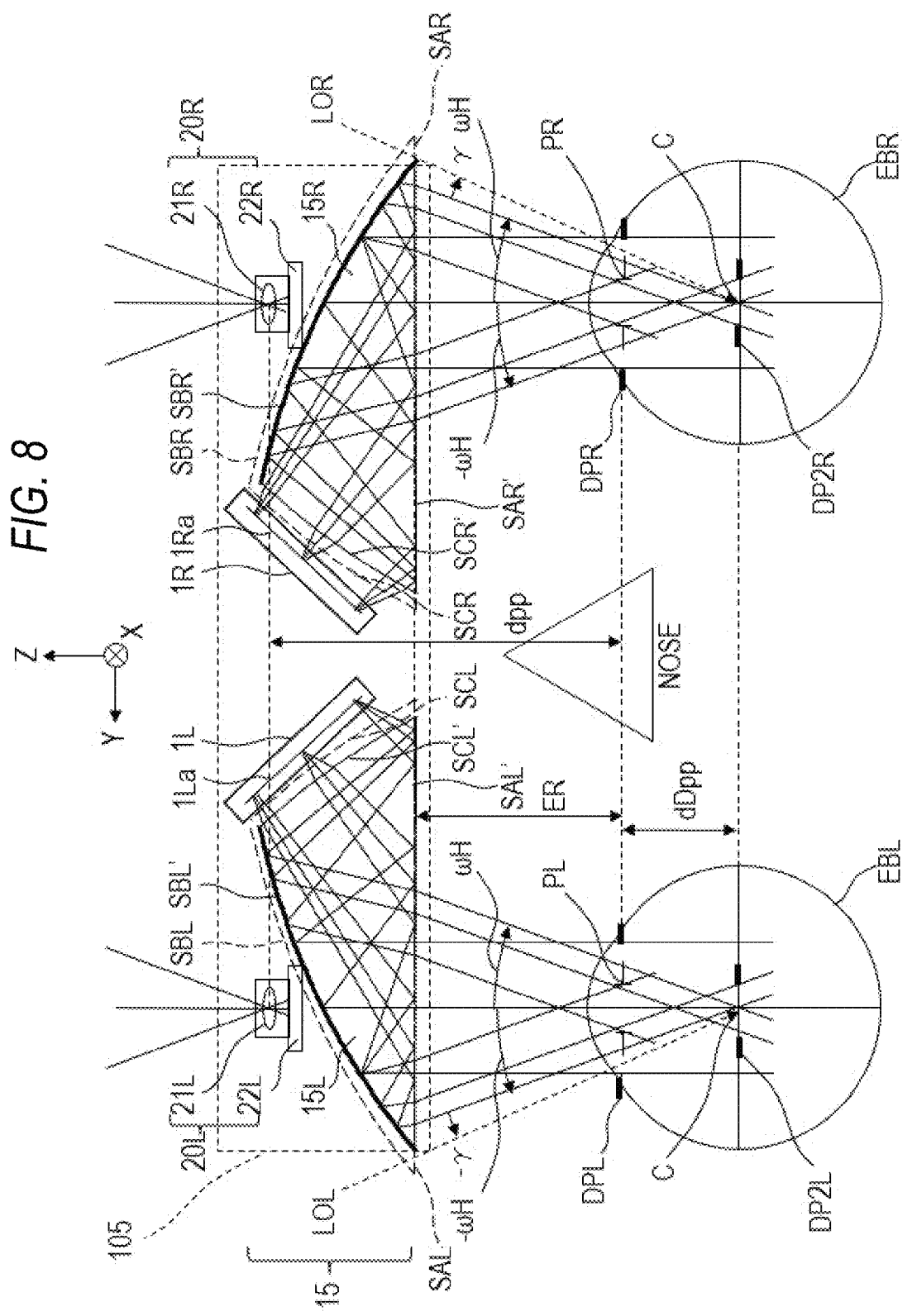
FIG. 8 is a schematic view of a main part of a display apparatus (105) according to a fifth example.

FIG. 8 is a schematic view of a main part of a display apparatus 105 according to a fifth example of the present disclosure. The same members as those in the embodiment are denoted by the same reference numerals, and the description of the reference numerals and the description of the optical paths are omitted. The fifth example is different from the embodiment (FIG. 1) in that the distances between the three surfaces of the decentered prism constituting a display optical system 15R (optical element) are reduced and the curvatures of the surfaces are slightly increased. More specifically, as illustrated in FIG. 8, with respect to the optical surface SAR, the incident surface SCR, and the reflection surface SBR of the embodiment shown by the broken lines, in the fifth example, the distances between the optical surface SAR', the incident surface SCR', and the reflection surface SBR' are reduced, and the display optical system 15R is reduced in size and thickness.

By reducing the size and thickness of the display optical system 15R, light emitted from the uppermost end portion of the display surface 1Ra of the display element 1R (for example, light B1 in FIG. 4) and light emitted from a lowermost end portion of the display surface 1Ra (for example, light B2 in FIG. 4) do not enter the exit pupil DPR and the second pupil DP2R. That is, in the fifth example, similarly to the second to fourth examples, a part of the light beam of the outermost peripheral angle of view on the outer side in the horizontal direction does not reach the evaluation pupil diameter at the second pupil DP2R, and furthermore, a part of the light beam of the innermost peripheral angle of view on the inner side in the horizontal direction does not reach the evaluation pupil diameter at the position of the second pupil DP2R. With this configuration, it is possible to reduce the size and thickness of the decentered prism, to suppress the display area of the display surface 1Ra, and to reduce the size of the display system 15. According to the fifth example, it is possible to provide the display apparatus 105 in which the size and weight of the apparatus are reduced, the distances dpp between the incident pupils of the imaging optical system 21R and the exit pupil DPR of the display optical systems 15R are suppressed, and the discomfort between the MR space observed through the HMD and the outside is further reduced.

Sixth Example

Figure 9:
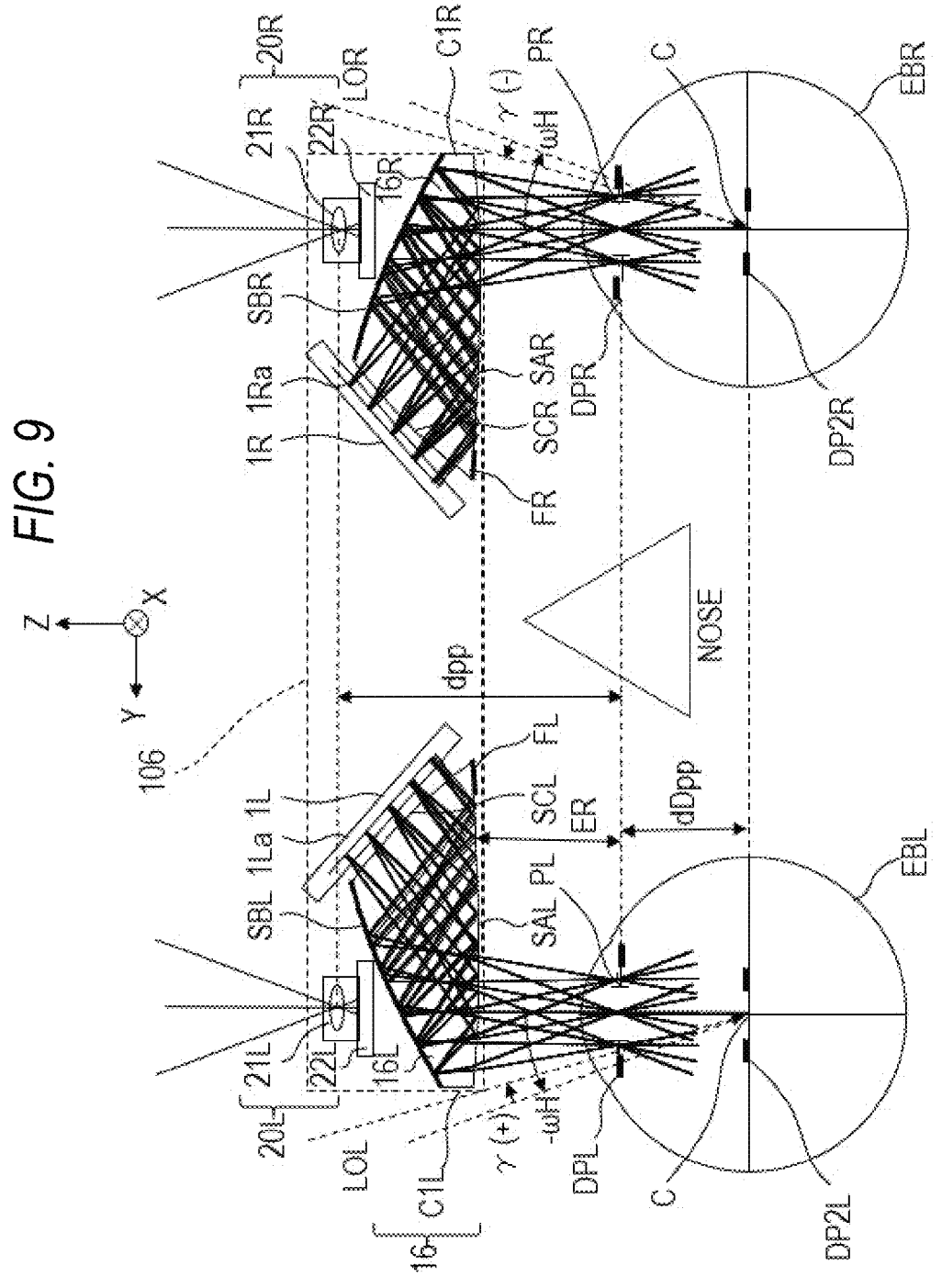
FIG. 9 is a schematic view of a main part of a display apparatus (106) according to a sixth example.

FIG. 9 is a schematic view of a main part of a display apparatus 106 according to a sixth example of the present disclosure. The same members as those in the embodiment are denoted by the same reference numerals, and the description of the reference numerals and the description of the optical paths are omitted. The difference between the sixth example and the second example (FIG. 4) is that the light beam width limitation is further increased as compared with the second example, and the eye relief ER is reduced. The configuration is different in that the light beam with the angle of view ωH is prevented from entering the evaluation pupil diameter of the second pupil DP2R, in addition, at the position of the exit pupil DPR of a display optical system 16R (optical element), the light beam of the angle of view ωH is partially vignetted and reduced. That is, all of the light beam of the outermost peripheral angle of view on the outer side in the horizontal direction does not reach the evaluation pupil diameter at the second pupil DP2R. And, all of the light beam of the innermost peripheral angle of view on the inner side in the horizontal direction does not reach the evaluation pupil diameter at the second pupil DP2R. Furthermore, since the light beam of the angle of view ωH is limited, a part of the light beam of the outermost peripheral angle of view on the outer side in the horizontal direction does not reach the evaluation pupil diameter (pupil PR) at the exit pupil DPR, and a part of the light beam of the innermost peripheral angle of view on the inner side in the horizontal direction does not reach the evaluation pupil diameter (pupil PR) at the exit pupil DPR.

Figure 10A:
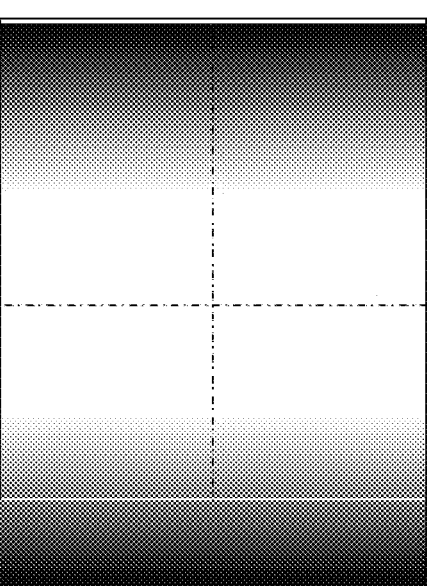
FIG. 10A and FIG. 10B are views illustrating images acquired by a camera in which an optical system incident pupil is arranged at the position of the second pupil in the display apparatus (106) of the sixth example.
Figure 10B:
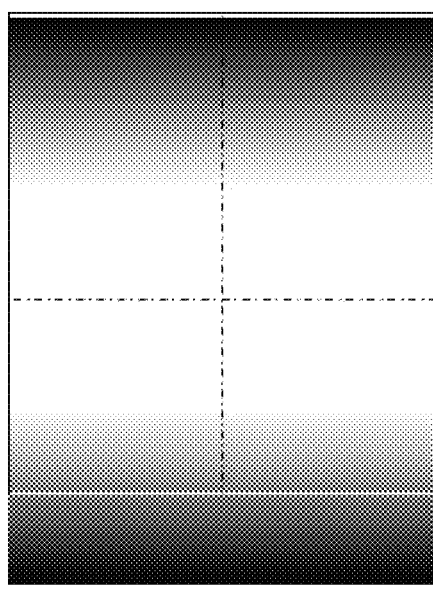

FIG. 10A and FIG. 10B are views illustrating images acquired by a camera as an optical system incident pupil which is arranged at the position of the second pupil DP2R in the sixth example. FIG. 10A illustrates an image acquired by the camera arranged at the position of the second pupil DP2L for the left-eye, and FIG. 10B illustrates an image acquired by the camera arranged at the position of the second pupil DP2R for the right-eye. What can be understood from the image near the display angle of view in the outermost peripheral portion is that when the right-side peripheral portion is gazed, not only the light is reduced but also an area where light does not come is similarly generated in the display image observed by the right-eyes and the display image observed by the left-eyes. In this way, some areas are not visible in the displayed image, but in the present example, as illustrated in FIG. 9, the external light LOR which passes through the end of the display apparatus 106 with respect to the angle of view ωH and is directly observed enters the second pupil DP2R at an angle of view smaller than the angle of view ωH. Then, the external direct light is made visible so as to complement the angle of view at which the display angle of view vignetting occurs. In this way, the area where the outside is visible is expanded by the amount of the reduction in the display angle of view during peripheral vision, and the apparatus is made to feel as if the MR space observed by the HMD is connected to the outside. According to the sixth example, the size of the decentered prism is reduced, to miniaturize an apparatus by further thinning it, to provide an apparatus which is reduced in weight, suppresses the distance dpp between the incident pupil of an imaging optical system and the exit pupil of a display optical system and further reduces the sense of discomfort between an MR space observed by an HMD and the outside.

As the eye relief ER, a value of eye relief/eye point described in a catalog, or a manual may be used. In addition, it is preferable that the display optical system realizes an effective viewing angle HFOV (full angle) of 30° in the horizontal direction, and an effective viewing angle VFOV of 20° or more in the vertical direction. More preferably, a display optical system that achieves HFOV of 35° or more, VFOV of 26° or more, and even more preferably HFOV of 40° or VFOV of 30° or more is preferable.

In addition, when the interpupillary adjustment is performed, it is desirable that the right-eye display system (including the right-eye display optical system and the right-eye display element 1R) and the right-eye imaging system 20R are integrally movable. Similarly, it is desirable that the left-eye display system (including the left-eye display optical system and the left-eye display element 1L) and the left-eye imaging system 20L are integrally movable. This ensures that the eye width of the user, the exit pupil center interval of the display apparatus, and the incident pupil center interval of the imaging system coincide with each other, and more natural MR space observation can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-139640, filed Aug. 30, 2023, which is hereby incorporated by reference herein in its entirety.

What is claimed is:

1. A display apparatus including a display system and imaging systems for a left-eye and a right-eye arranged on an outside of the display system, and configured to display an image of the outside acquired by each of the imaging systems at substantially equal magnification on the display system, the display system comprising:

a display element, and an optical element comprising an incident surface, two reflection surfaces and an exit surface, wherein the optical element is configured such that light emitted from a central position of the display element enters the optical element from the incident surface, is reflected by the two reflection surfaces so as to be directed outward in a horizontal direction while being folded in a visual axis direction, is emitted from the exit surface, and is guided to an exit pupil of the optical element, wherein the display apparatus comprises a limiter configured to limit a light beam width so that a light beam entering a second pupil located behind the exit pupil does not satisfy a diameter of the second pupil, wherein when the second pupil is set at a position on an optical axis 10 mm away on an opposite side of the optical element with respect to the exit pupil as a reference, the limiter limits the light beam width such that at least a part of the light beam of an outermost peripheral angle of view on an outer side in the horizontal direction does not reach an inner side of an evaluation pupil diameter of the second pupil, and wherein a following conditional expression is satisfied:

$$\gamma \leq \omega H/2$$

wherein $\omega H$ is a horizontal maximum angle of view displayed by the display element, and $\gamma$ is a difference between $\omega H$ and the minimum angle of view incident on a center of the second pupil when the outside is directly observed.

2. The display apparatus according to claim 1, wherein the limiter limits the light beam width such that a part of the light beam of an outermost peripheral angle of view on an inner side in the horizontal direction does not reach the inner side of the evaluation pupil diameter of the second pupil.

3. The display apparatus according to claim 1, wherein the limiter limits the light beam width such that all of the light beam of an outermost peripheral angle of view on an outer side in the horizontal direction does not reach the inner side of the evaluation pupil diameter of the second pupil.

4. The display apparatus according to claim 1, wherein the limiter limits the light beam width such that all of the light beam of an outermost peripheral angle of view on an inner side in the horizontal direction does not reach the inner side of the evaluation pupil diameter of the second pupil.

5. The display apparatus according to claim 1, wherein the limiter limits the light beam width such that a part of the light beam of an outermost peripheral angle of view on an outer side in the horizontal direction does not reach an evaluation pupil diameter of the exit pupil of the optical element.

6. The display apparatus according to claim 1, wherein the limiter limits the light beam width such that a part of the light beam of an outermost peripheral angle of view on an inner side in the horizontal direction does not reach an evaluation pupil diameter of the exit pupil of the optical element.

7. The display apparatus according to claim 1, wherein the evaluation pupil diameter is 4 mm.

8. The display apparatus according to claim 1, wherein the optical element is a prism element having a decentered shape, and wherein the limiter has an end surface formed by cutting off at least one of two acute angle portions of the prism element.

9. The display apparatus according to claim 1, wherein the optical element is a prism element having a decentered shape, and wherein the limiter includes a light shielding film formed on a part of one of the reflection surfaces forming the prism element.

10. The display apparatus according to claim 1, wherein the optical element is a prism element having a decentered shape, and wherein the limiter includes a limiting portion that limits an area of a reflection film formed on the other of the reflection surfaces forming the prism element.

* * * * *